United States Patent [19]
Yamaoka

[11] Patent Number: 5,316,113
[45] Date of Patent: May 31, 1994

[54] HYDRAULIC SHOCK ABSORBER

[75] Inventor: Fumiyuki Yamaoka, Kanagawa, Japan

[73] Assignee: Atsugi Motor Parts Company Ltd., Atsugi, Japan

[21] Appl. No.: 44,965

[22] Filed: Apr. 8, 1993

Related U.S. Application Data

[63] Continuation of Ser. No. 619,870, Nov. 29, 1990, abandoned, which is a continuation of Ser. No. 272,551, Nov. 17, 1988, abandoned.

[30] Foreign Application Priority Data

Nov. 19, 1987 [JP] Japan .................. 62-292586

[51] Int. Cl.$^5$ ............................... F16F 9/348
[52] U.S. Cl. ..................... 188/282; 188/320; 188/322.15
[58] Field of Search ............... 188/316, 317, 315, 282, 188/320, 322.13, 322.14, 322.15; 137/513.3, 854

[56] References Cited

U.S. PATENT DOCUMENTS

| | | | |
|---|---|---|---|
| 3,756,357 | 9/1973 | Graff et al. | 188/282 |
| 4,460,074 | 7/1984 | Muller et al. | 188/322.14 |
| 4,512,447 | 4/1985 | Miura | 188/320 X |
| 4,809,828 | 3/1989 | Nakazato | 188/320 X |
| 4,834,222 | 5/1989 | Kato et al. | 188/282 X |

FOREIGN PATENT DOCUMENTS

2917958 1/1980 Fed. Rep. of Germany ...... 188/317

Primary Examiner—Robert J. Oberleitner
Assistant Examiner—Kevin D. Rutherford
Attorney, Agent, or Firm—Bachman & LaPointe

[57] ABSTRACT

A hydraulic shock absorber includes a hollow cylinder which defines therein a fluid chamber filled with a working fluid, and a piston which is reciprocally disposed within the fluid chamber and divides the fluid chamber into upper and lower chambers. The piston is formed with fluid passages for establishing fluid communication between the upper and lower chambers. Each of the fluid passages is controlled by a disk valve assembly comprising a plurality of elastic disk plates, so as to introduce the working fluid from one of the upper and lower chambers to the other chamber when fluid pressure in one of the chambers is greater than a predetermined value. The disk valve assembly has a bypassing fluid passage which has a plurality orifices configured so as to gradually decrease fluid pressure and flow velocity of the working fluid passing therethrough.

6 Claims, 9 Drawing Sheets

HYDRAULIC SHOCK ABSORBER

This is a continuation of application Ser. No. 07/619,870 filed Nov. 29, 1990 now abandoned, which is a continuation of application Ser. No. 07/272,551 filed Nov. 17, 1988 now abandoned.

BACKGROUND OF THE INVENTION

1. Field of the Invention

The present invention relates generally to a hydraulic shock absorber for absorbing shock applied thereto and is applicable to a vehicle suspension, for example. More specifically, the invention relates to a hydraulic shock absorber which has fluid passages for establishing fluid communication between upper and lower fluid chambers defined by a piston of the shock absorber.

2. Description of the Prior Art

Generally, hydraulic shock absorbers have a cylinder filled with a working fluid, and a piston which divides the fluid chamber within the cylinder into upper and lower chambers. The piston is formed with a fluid passage which establishes fluid communication between the upper and lower chambers. A disk valve assembly comprising a plurality of elastic disk plates covers one end of the fluid passage. The inner portion of the disk valve assembly is fixed to the piston, and the outer portion thereof is in contact with the piston, so that a space is established between the disk valve assembly and the piston when the disk valve assembly is deformed due to the fluid pressure in the chamber of the cylinder. In such a disk assembly, fluid resistance is applied to the working fluid passing through the fluid passage, so that a predetermined damping force is applied to the piston.

In order to effectively apply a damping force to the piston when the amplitude of the piston is relatively large as well as very small, the Japanese Utility-Model First (unexamined) Publication (Jikkai Sho.) No. 60-52438 discloses an improved hydraulic shock absorber. The disclosed shock absorber has a disk valve assembly comprising a plurality of elastic disk plates, and an orifice establishing fluid communication between upper and lower chambers of the cylinder is formed in one disk plate which is brought into contact with the valve seat surface of the piston. By this orifice, flow resistance is applied to the working fluid passing through the fluid passage, so that a predetermined damping force can be applied to the piston even if the amplitude of the piston is very small.

However, in such a hydraulic shock absorber, difference between fluid pressures before and behind the disk valve assembly is relatively great. Therefore, when the working fluid which passes through the orifice has high flow velocity, vortex flow and cavitation are produced in the downstream chamber, thereby causing fluid noise of the working fluid.

SUMMARY OF THE INVENTION

It is therefore a principal object of the present invention to eliminate the aforementioned disadvantage and to provide a hydraulic shock absorber which effectively apply a damping force to a piston when the amplitude of the piston is relatively large as well as very small.

It is another object of the invention to provide a hydraulic shock absorber which can avoid vortex flow and cavitation in the downstream chamber to decrease fluid noise of the working fluid.

In order to accomplish the aforementioned and other specific objects, a hydraulic shock absorber, according to the present invention, has a fluid passage which is incorporated in valve means used for a piston or base valve. The fluid passage establishes fluid communication between upstream and downstream chambers and has a plurality of narrowed portions which are arranged in series.

According to one aspect of the present invention, a shock absorber comprises:

a hollow cylinder defining therein a fluid chamber filled with a working fluid;

a piston reciprocally disposed within the fluid chamber and dividing the fluid chamber into first and second chambers;

first and second fluid passage means for establishing fluid communication between the first and second chambers;

first valve means, associated with the first fluid passage means, for allowing the working fluid in the first chamber to be introduced into the second chamber when fluid pressure in the first chamber is greater than a predetermined value, and for restricting the working fluid in the second chamber from being introduced into the first chamber;

second valve means, associated with the second fluid passage means, for allowing the working fluid in the second chamber to be introduced into the first chamber when fluid pressure in the second chamber is greater than a predetermined value, and for restricting the working fluid in the first chamber from being introduced into the second chamber; and third fluid passage means, incorporated in the first valve means, for establishing fluid communication between the first and second chambers, the third fluid passage means having a plurality of narrowed portions which are arranged in series.

The first valve means may comprise a plurality of elastic disk plates which are deformed by fluid pressure in the first chamber for allowing the working fluid in the first chamber to be introduced into the second chamber. The disk plates is preferably piled up for forming the third fluid passage means. The narrowed portions may serve as orifices for decreasing flow area of the third fluid passage means.

According to another aspect of the invention, a shock absorber comprises:

a hollow cylinder defining therein a fluid chamber filled with a working fluid;

a piston reciprocally disposed within the fluid chamber and dividing the fluid chamber into first and second chambers;

a base valve disposed within the fluid chamber on the bottom thereof and separating in the fluid chamber a third chamber from the second chamber;

first and second fluid passage means for establishing fluid communication between the second and third chambers;

first valve means, associated with the first fluid passage means, for allowing the working fluid in the second chamber to be introduced into the third chamber when fluid pressure in the second chamber is greater than a predetermined value, and restricting the working fluid in the third chamber from being introduced into the second chamber;

second valve means, associated with the second fluid passage means, for allowing the working fluid in the third chamber to be introduced into the second chamber when fluid pressure in the third chamber is greater than a predetermined value, and restricting the working fluid in the second chamber from being introduced into the third chamber; and third fluid passage means, incorporated in the first valve means, for establishing fluid communication between the second and third chambers, the third fluid passage means having a plurality of narrowed portions which are arranged in series.

The first valve means may comprises a plurality of elastic disk plates which are deformed by fluid pressure in the second chamber for allowing the working fluid in the second chamber to be introduced into the third chamber. The disk plates are preferably piled up for forming the third fluid passage means. The narrowed portions may serve as orifices for decreasing flow area of the third fluid passage means.

According to another aspect of the invention, a shock absorber comprises:

- a hollow cylinder defining therein a fluid chamber filled with a working fluid;
- a piston reciprocally disposed within the fluid chamber and dividing the fluid chamber into first and second chambers;
- first fluid passage means for allowing the working fluid in the first chamber to be introduced into the second chamber when fluid pressure in the first chamber is greater than a predetermined value, and for preventing the working fluid in the second chamber from being introduced into the first chamber;
- second fluid passage means for allowing the working fluid in the second chamber to be introduced into the first chamber when fluid pressure in the second chamber is greater than a predetermined value, and for preventing the working fluid in the first chamber from being introduced into the second chamber; and
- third fluid passage means for establishing fluid communication between the first and second chambers, the third fluid passage means having a plurality of narrowed portions which are arranged in series.

According to another aspect of the invention, a shock absorber comprises:

- a hollow cylinder defining therein a fluid chamber filled with a working fluid;
- a piston reciprocally disposed within the fluid chamber and dividing the fluid chamber into first and second chambers;
- a base valve disposed within the fluid chamber on the bottom thereof and separating in the fluid chamber a third chamber from the second chamber;
- first fluid passage means for allowing the working fluid in the second chamber to be introduced into the third chamber when fluid pressure in the second chamber is greater than a predetermined value, and for preventing the working fluid in the third chamber from being introduced into the second chamber;
- second fluid passage means for allowing the working fluid in the third chamber to be introduced into the second chamber when fluid pressure in the third chamber is greater than a predetermined value, and for preventing the working fluid in the second chamber from being introduced into the third chamber; and
- third fluid passage means for establishing fluid communication between the second and third chambers, the third fluid passage means having a plurality of narrowed portions which are arranged in series.

According to another aspect of the invention, a shock absorber comprises:

- a hollow cylinder defining therein a fluid chamber filled with a working fluid;
- a piston reciprocally disposed within the fluid chamber and dividing the fluid chamber into first and second chambers, the piston having first and second fluid passage means for establishing fluid communication between the first and second chambers;
- first valve means, associated with the first fluid passage means, for allowing the working fluid in the first chamber to be introduced into the second chamber when fluid pressure in the first chamber is greater than a predetermined value, and for preventing the working fluid in the second chamber from being introduced into said first chamber, the first valve means having a bypassing fluid passage which establishes fluid communication between the first and second chambers, and the bypassing fluid passage having a plurality of narrowed portions serving as orifices which are arranged in series; and
- second valve means, associated with the second fluid passage means, for allowing the working fluid in the second chamber to be introduced into the first chamber when fluid pressure in the second chamber is greater than a predetermined value, and for preventing the working fluid in the first chamber from being introduced into the second fluid chamber.

According to another aspect of the invention, a shock absorber comprises:

- a hollow cylinder defining therein a fluid chamber filled with a working fluid;
- a piston reciprocally disposed within the fluid chamber and dividing the fluid chamber into first and second chambers;
- a base valve disposed within the fluid chamber on the bottom thereof and separating in the fluid chamber a third chamber from the second chamber, the base valve having first and second fluid passage means for establishing fluid communication between the second and third chambers;
- first valve means, associated with the first fluid passage means, for allowing the working fluid in the second chamber to be introduced into the third chamber when fluid pressure in the second chamber is greater than a predetermined value, and for preventing the working fluid in the third chamber from being introduced into the second chamber, the first valve means having a bypassing fluid passage which establishes fluid communication between the second and third chambers, and the bypassing fluid passage having a plurality of narrowed portions serving as orifices which are arranged in series; and
- second valve means, associated with the second fluid passage means, for allowing the working fluid in the third chamber to be introduced into the second chamber when the fluid pressure in the third chamber is greater than a predetermined value, and for preventing the working fluid in the second chamber from being introduced into the third chamber.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to this specific embodiment, but are for explanation and understanding only.

In the drawings.

DESCRIPTION OF THE PREFERRED EMBODIMENT

Referring now to the drawings, particularly to FIGS. 1 to 5, there is illustrated a first embodiment of a hydraulic shock absorber according to the present invention. The hydraulic shock absorber comprises a hollow cylinder 10 and a piston 12 which is movably or reciprocally disposed within the cylinder 10. The cylinder 10 defines a chamber which is filled with a working fluid and which is divided into upper and lower chambers 14 and 16 by the piston 12. The piston 12 is secured to the lower end of a piston rod 18 which has an upper end extending out of the cylinder 10 and attached to a vehicle body chassis not shown. On the other hand, the lower end of the cylinder 10 is attached to a wheel axle not shown. The piston 12 is formed with a plurality of fluid passages 20 which serve to introduce the working fluid from the upper chamber 14 to the lower chamber 16, and a plurality of fluid passages 22 which serve to introduce the working fluid from the lower chamber 16 to the upper chamber 14. A disk valve assembly 24 covers the lower open ends of the fluid passages 20. The inner portion of the disk valve assembly 24 is fixed to a boss portion 12a of the piston by means of a nut 26 via a washer 28 and a spacer 30. The outer portion of the disk valve assembly 24 is thrusted by means of a spring 32 via a retainer 34 to be brought into contact with a seating surface 12b of the piston 12. The retainer 34 is connected to one end of the spring 32, and is slidably supported on the outer surface of the spacer 30.

Figure 1:
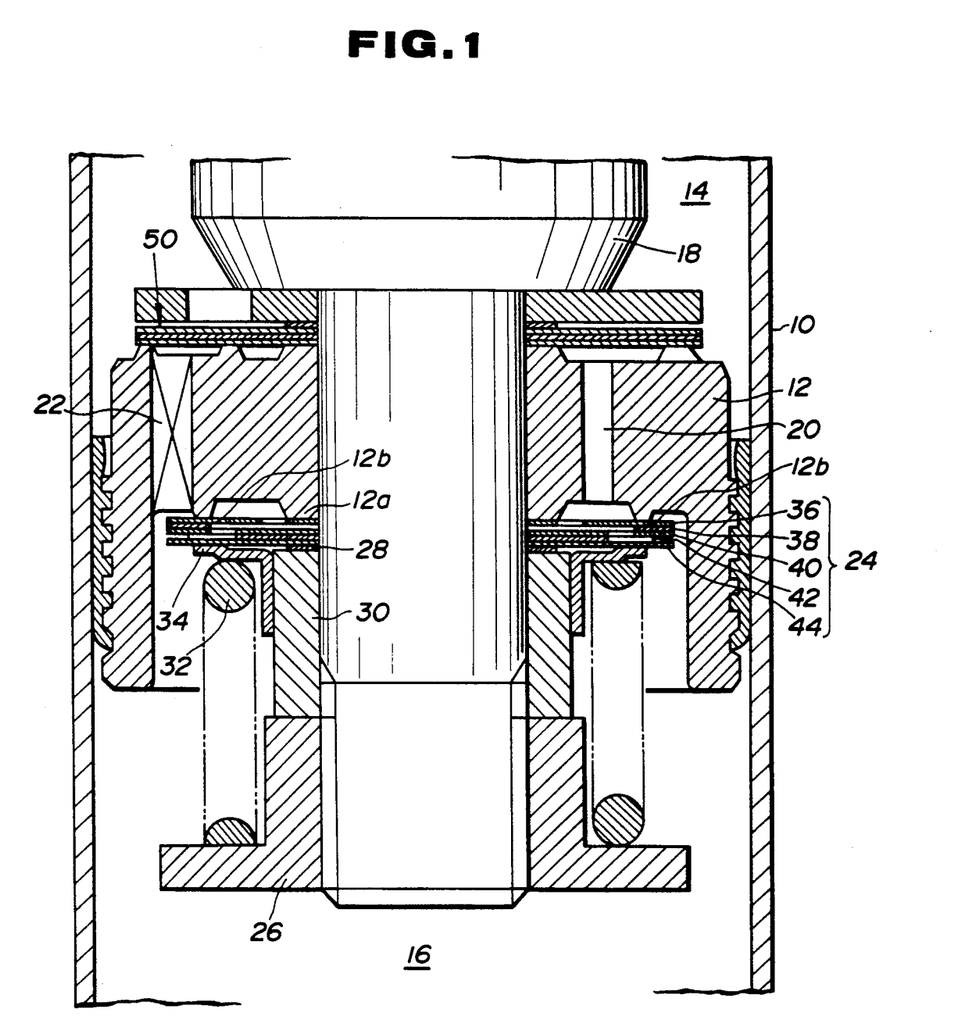
FIG. 1 is a sectional view of a first preferred embodiment of a hydraulic shock absorber according to the present invention, which illustrates main part of the shock absorber.

The disk valve assembly 24 comprises a plurality of elastic, annular disk plates 36, 38, 40, 42 and 44. Since the inner portion of the disk valve assembly is fixed to the boss portion 12a of the piston 12 and the outer portion thereof is thrusted into contact with the seating surface 12b of the piston 12, the disk valve assembly 24 can serve to produce a damping force in the expansion stroke, i.e. when the piston 12 moves upwardly. These disk plates 36, 38, 40, 42 and 44 will be referred herebelow to as "first disk plate", "first constant orifice plate", "second disk plate", "second constant orifice plate" and "third disk plate", respectively. The first disk plate 36 is disposed on the boss portion 12a and the seating surface 12b of the piston 12. The first constant orifice plate 38 has essentially the same diameter as that of the first disk plate 36, and is disposed on the first disk plate 36 on the opposite side to the piston 12. The second disk plate 40 has essentially the same diameter as that of the first constant orifice plate 38, and is disposed on the first constant orifice plate 38 on the opposite side to the first disk plate 36. The second constant orifice plate 42 has a smaller diameter than that of the second disk plate 40, and is disposed on the second disk plate 40 on the opposite side to the first constant orifice plate 38. The third disk plate 44 has essentially the same diameter as that of the second disk plate 40, and is disposed on the second constant orifice plate 42 on the opposite side to the second disk plate 40. An annular space 46 is formed between the second and third disk plates 40 and 44 outside the second constant orifice plate 42.

Figure 2:
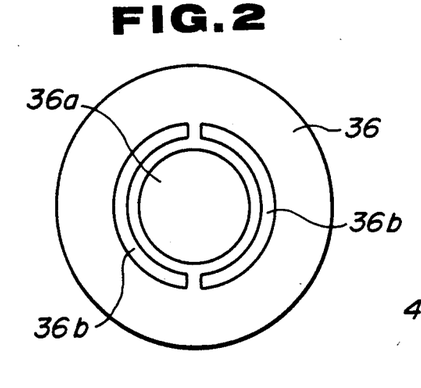
FIGS. 2 to 6 are plan views of disk plates of a disk valve assembly used for the shock absorber of FIG. 1.
Figure 3:
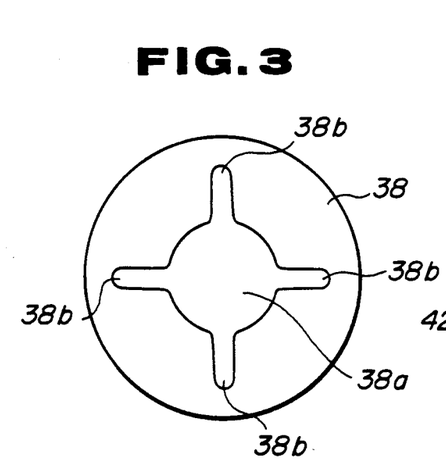
Figure 4:
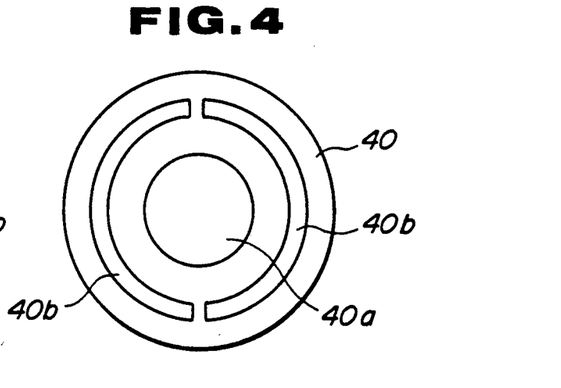
Figure 5:
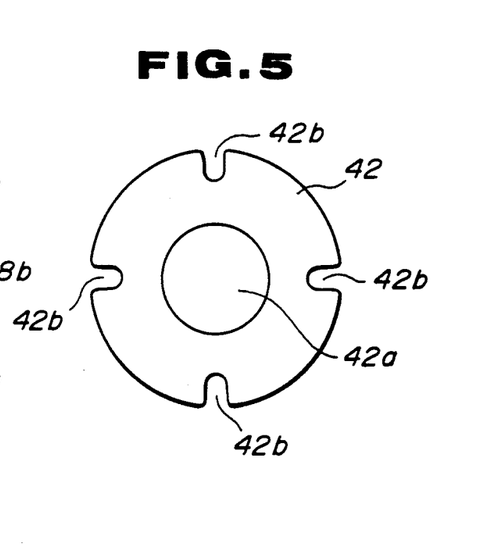

As can be seen clearly from FIGS. 2 to 6, the respective disk plates 36 to 44 have a circular through openings 36a, 38a, 40a, 42a and 44a at the center thereof, the diameters of which are similar to each other. As shown in FIG. 2, the first disk plate 36 has a pair of arc-shaped through openings 36b which are arranged at locations neighboring the circular through opening 36a so as to surround essentially the entire circumference of the circular through opening 36a. The arc-shaped through openings 36b are designed to be in fluid communication with the fluid passages 20. As shown in FIG. 3, the circular through openings 38a of the first constant orifice plate 38 has four radially extending portions 38b which are so arranged as to be essentially perpendicular to each other. The radially extending portions 38b are designed to be in fluid communication with the arc-shaped through openings 36b (located upstream of 38b) at locations neighboring the roots thereof. The radially extending portions 38b serve as orifices and thus will be referred to as "first constant orifices". As shown in FIG. 4, the second disk plate 40 has a pair of arc-shaped through openings 40b (located downstream of 38b) which are so arranged as to surround essentially the entire circumference of the circular through opening 40a. The radius of curvature of the arc-shaped through opening 40b is greater than that of the arc-shaped through opening 36b of the first disk plate 36, so that the first constant orifices 38b of the first constant orifice plate 38 are in fluid communication with the arc-shaped through openings 40b at locations neighboring the tips thereof. The second constant orifice plate 42 has four U-shaped cut-outs 42b which are formed at the circumference thereof at constant intervals so as to extend radially, so that the U-shaped cut-outs 42b are designed to be in fluid communication with the arc-shaped through openings 40b. The U shaped cut outs 42b also serve as orifices, and thus will be referred to as "second constant orifices". As shown in FIG. 7, a bypassing fluid passage 48 comprising the arc-shaped through opening 36b, the first constant orifice 38b, the arc-shaped through opening 40b, the second constant orifice 42b and the annular space 46, is formed in the disk valve assembly 24, and thus the communication between the upper and lower chambers 14 and 16 is established by the bypassing fluid passage 48.

A disk valve assembly 50 comprising a plurality of elastic, annular disk plates covers the upper open ends of the fluid passage 22. Similar to the disk valve assembly 24, the inner portion of the disk valve assembly 50 is fixed to the piston 12, and the outer portion thereof is brought into contact with the piston 12, so that the disk valve assembly 50 serves to produce a damping force in the compression stroke, i.e. when the piston 12 moves downwardly.

With the aforementioned constructions, when the amplitude of the piston 12 is very small, the working fluid in the upper chamber 14 is introduced into the lower chamber 16 via the bypassing fluid passage 48. In this case, flow resistance is applied to the working fluid by means of the first and second constant orifices 38b and 42b which are arranged in series, and thus flow velocity and fluid pressure of the working fluid are decreased. Therefore, compared with the prior art, the difference between the fluid pressures before and behind each of the first and second constant orifices 38b and 42b is decreased, and the flow velocity of the working fluid passing through each of the orifices is decreased gradually, so that the Reynolds number of the fluid passing through the respective orifices is decreased. Therefore, it is possible to avoid vortex flow and cavitation and to decrease fluid noise due to the vortex flow and cavitation, since the fluid pressure and flow velocity of the working fluid is decreased while the working fluid passes through the bypassing fluid passages 48 before the working fluid is introduced into the lower chamber 16.

In cases where the amplitude of the piston 12 is relatively high, in the expansion stroke of the piston 12, i.e. when the piston moves upwardly, the outer portion of the disk valve assembly 24 is bent downwards against the thrusting force of the spring 32 due to fluid pressure in the upper chamber 14. As a result, a space is formed between the seating surface 12b of the piston 12 and the disk valve assembly 24, so that a great part of working fluid passing through the fluid passage 22 is introduced into the lower chamber 16 via the space. In this case, flow resistance is applied to the working fluid while it passes through the space between the seating surface 12b and the disk valve assembly 24. On the other hand, in the compression stroke of the piston 12, i.e. when the piston moves downwardly, the outer portion of the disk valve assembly 50 is deformed due to fluid pressure in the lower chamber 16, so that the working fluid in the lower chamber 16 is introduced into the upper chamber 14 via the fluid passage 22 while flow resistance is applied to the working fluid.

Figure 6:
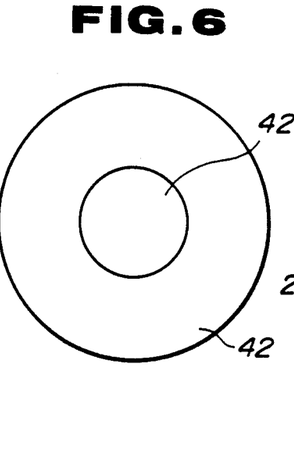
Figure 7:
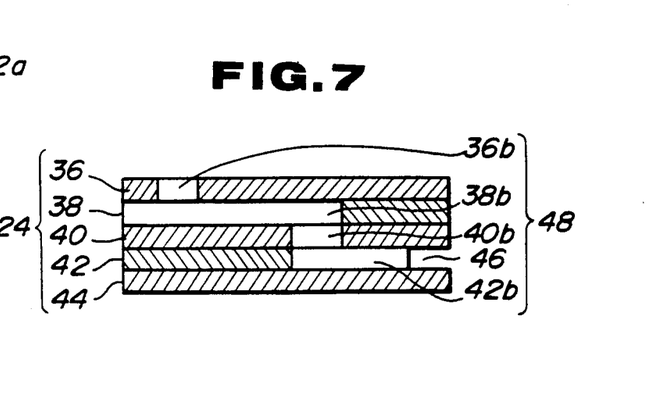
FIG. 7 is a sectional view of the disk plates of FIGS. 2 to 6, which illustrates a bypassing fluid passage formed in the disk plates.
Figure 8:
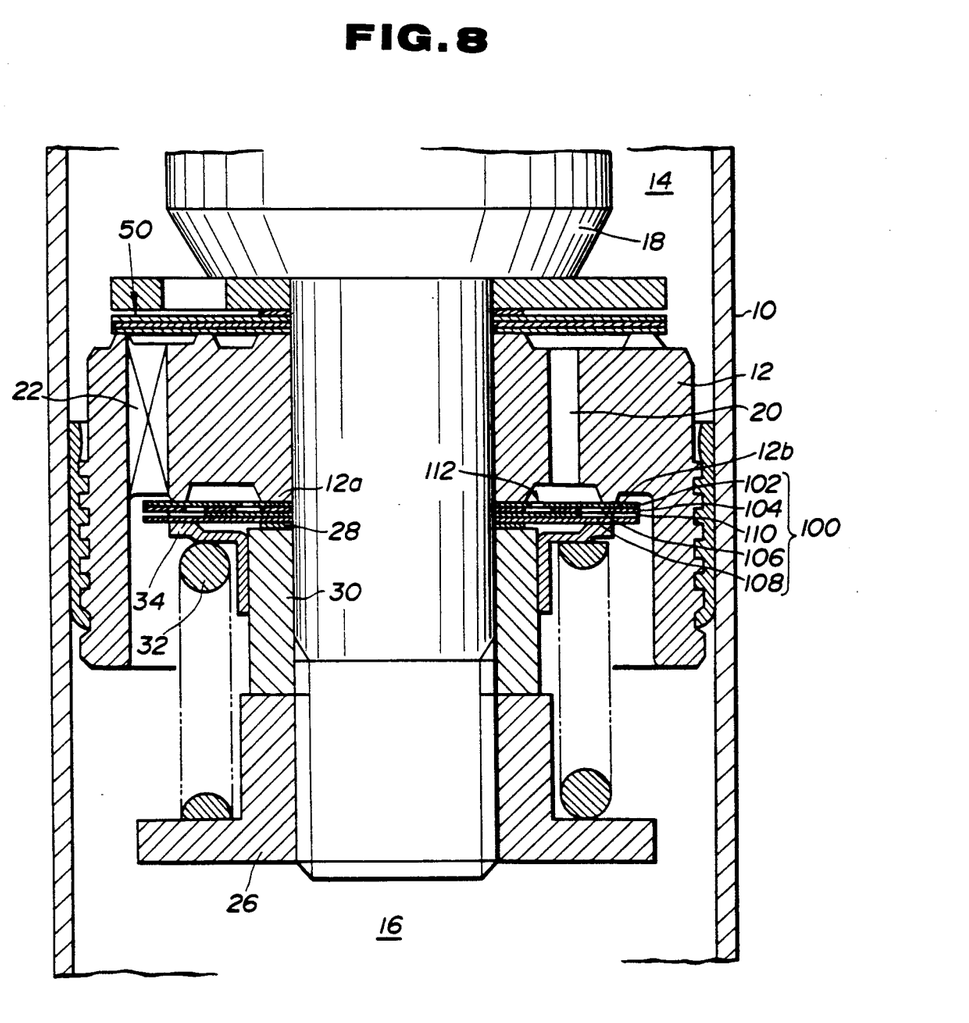
FIG. 8 is a sectional view of a second preferred embodiment of a hydraulic shock absorber according to the present invention, which illustrates main part of the shock absorber.

FIG. 6 illustrates a second preferred embodiment of a hydraulic shock absorber according to the present invention. The construction of this embodiment is similar to that of the first embodiment except that a disk valve assembly 100 is substituted for the disk valve assembly 24. The disk valve assembly 100 comprises a plurality of elastic, annular disk plates 102, 104, 106 and 108 which will be referred to herebelow as "first constant orifice plate", "first disk plate", "second constant orifice plate" and "second disk plate", respectively. The first constant orifice plate 102 is disposed on the boss portion 12a and the seating surface 12b of the piston 12. The first disk plate 104 has essentially the same diameter as that of the first constant orifice plate 102, and is disposed on the first constant orifice plate 102 on the opposite side to the piston 12. The second constant orifice plate 106 has a smaller diameter than that of the first disk plate 104, and is disposed on the first disk plate 104 on the opposite side to the first constant orifice plate 102. The second disk plate 108 is essentially the same diameter as that of the first disk plate 104, and is disposed on the second constant orifice plate 106 on the opposite side to the first disk plate 104. An annular space 110 is formed between the first and second disk plates 104 and 108 outside the second constant orifice plate 106.

Figure 9:
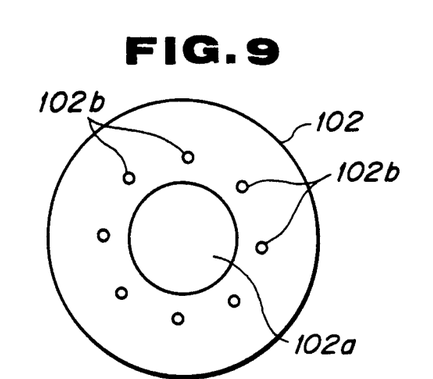
FIGS. 9 to 13 are plan views of disk plates of a disk valve assembly used for the shock absorber of FIG. 8.
Figure 10:
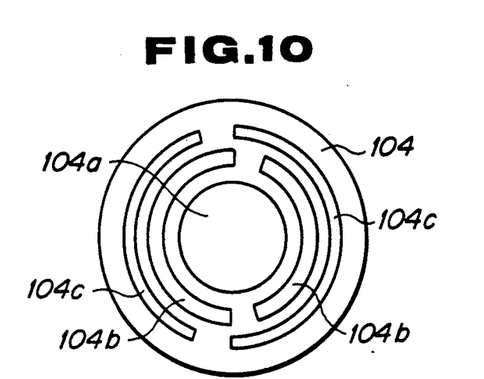
Figure 11:
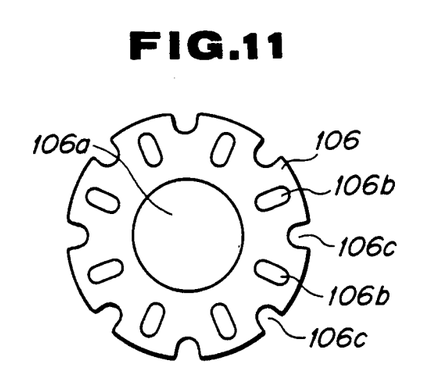
Figure 12:
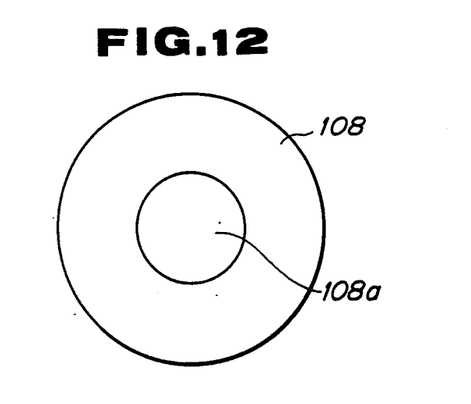
Figure 13:
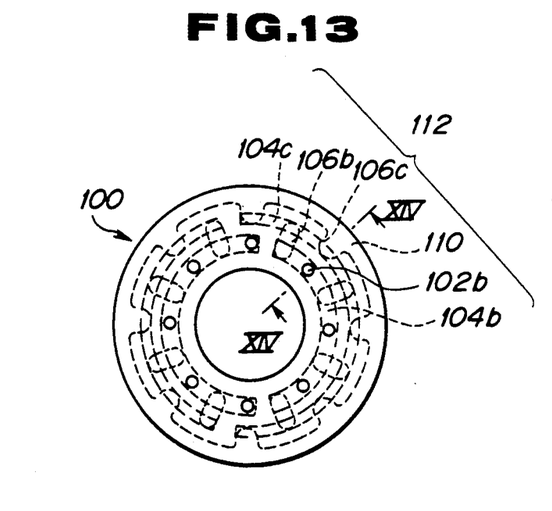
Figure 14:
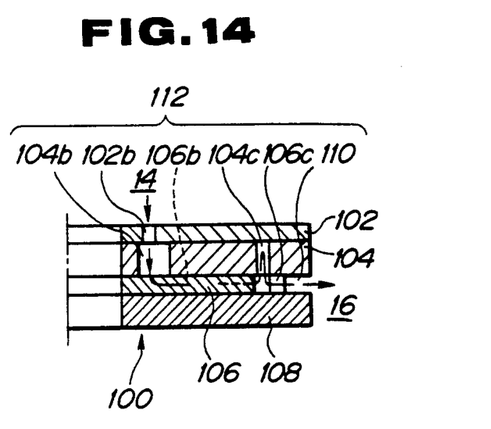
FIG. 14 is a fragmentary sectional view of the disk plates of FIGS. 9 to 13, which illustrates a bypassing fluid passage formed in the disk plates.

As can be seen clearly from FIGS. 9 to 12, the respective disk plates 102 to 108 have circular through openings 102a, 104a, 106a and 108a at the center thereof, the diameters of which are similar to each other. As shown in FIG. 9, the first constant orifice plate 102 has a plurality of orifices 102b, which will be referred to as "first constant orifices" and which are arranged at locations neighboring the circular through opening 102a spaced at predetermined intervals. The first constant orifices 120b are designed to be in fluid communication with the fluid passage 20. As shown in FIG. 10, the first disk plate 104 has a pair of arc-shaped wider through openings 104b which are concentrically arranged at locations neighboring the circular through opening 104a so as to surround essentially the entire circumference of the circular through opening 104a. The arc-shaped wider through openings 104b are designed to be in fluid communication with the first constant orifice 102b. The first disk plate 104 also has a pair of arc-shaped narrower through openings 104c which are concentrically arranged outside the arc-shaped wider through openings 104b. The outer, narrower through openings 104c are shifted in relation to the inner, wider through openings 104b in the direction of the circumference of the first disk plate 104. As shown in FIG. 11, the second constant orifice plate 106 has a plurality of radially extending through openings 106b which are arranged at predetermined intervals and which are in fluid communication with the wider and narrower through openings 104b and 104c of the first disk plate 104. The second constant orifice plate 106 also has a plurality of U-shaped cut-outs 106c which are formed at the circumference thereof between the radially extending through openings 106b and extends radially and which are in fluid communication with the narrower through openings 104c of the first disk plate 104. As shown in FIG. 14, the first and second constant orifice plates 102 and 106 are thinner than the first and second disk plates 104 and 108. The cross-sectional area of flow passage in the radially extending through opening 106b of the second constant orifice plate 106 is designed to be less than that in the wider arc-shaped through opening 104b of the first disk plate 104, and greater than that in the narrower arc-shaped through opening 104c. That is, as shown in FIG. 14, the thickness of the second constant orifice plate 106 is designed to be less than the width of the wider arc-shaped through opening 104b and greater than the width of the narrower arc-shaped through opening 104c. In addition, the cross-sectional area of flow passage in the cut-out 106c is designed to be less than that in the narrower arc-shaped through opening 104c of the first disk plate 104. Therefore, the radially extending through opening 106b, the narrower arc-shaped through opening 104c and the U-shaped cut out 106c serve as orifices and thus will be referred to as "second constant orifice", "third constant orifice" and "fourth constant orifice", respectively. As shown in FIGS. 13 and 14, a bypassing fluid passage 112 comprising the first constant orifice 102b, the wider arc-shaped through opening 104b, the radially extending through opening 106b, the narrower arc-shaped through opening 104c, the U-shaped cut-out 106c and the annular space 110, is formed in the disk valve assembly 100, and thus the communication between the upper and lower chambers 14 and 16 is established by the bypassing fluid passage 112.

With the aforementioned constructions, when the working fluid in the upper chamber 14 is introduced into the lower chamber 16 while the amplitude of the piston 12 is very small, flow resistances are applied to the working fluid at four points in the flow path by means of the first, second, third and fourth constant orifices 102b, 106b, 104c and 106c which are arranged in series. Therefore, compared with the first preferred embodiment of a hydraulic shock absorber of the invention, differences between fluid pressures before and behind each of orifices, and differences between the flow velocity before and behind the latter become smaller. As a result, compared with the first embodiment, the fluid pressure and flow velocity of the working fluid is more gradually decreased, so that it is possible to more effectively decrease flow noise of the working fluid.

Figure 15:
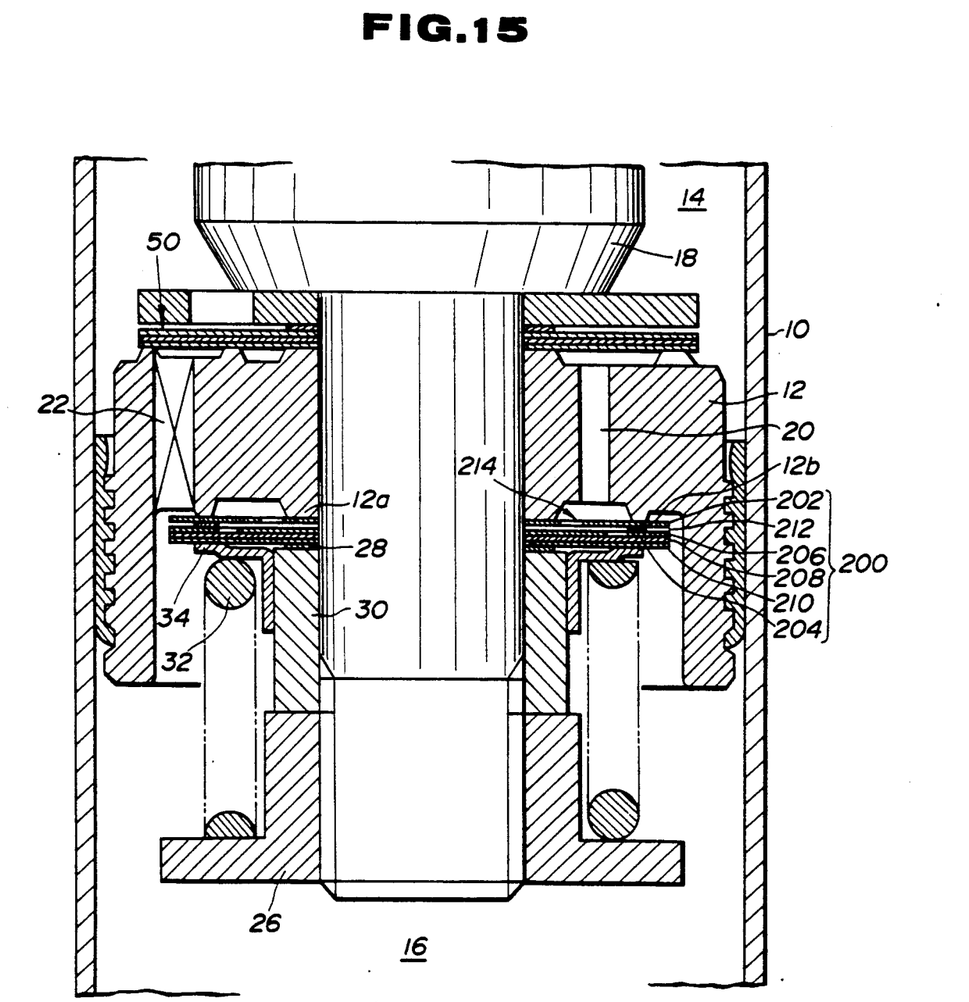
FIG. 15 is a sectional view of a third preferred embodiment of a hydraulic shock absorber according to the present invention, which illustrates main part of the shock absorber.

FIG. 15 illustrates a third preferred embodiment of a hydraulic shock absorber according to the present invention. The construction of this embodiment is similar to that of the first embodiment except that a disk valve assembly 200 is substituted for the disk valve assembly 24.

The disk valve assembly 200 comprises a plurality of elastic, annular disk plates 202, 204, 206, 208 and 210 which will be referred herebelow to as "first disk plate", "constant orifice plate", "second disk plate", "third disk plate" and "fourth disk plate", respectively. The first disk plate 202 is disposed on the boss portion 12a and the seating surface 12b of the piston 12. The constant orifice plate 204 has a smaller diameter than that of the first disk plate 202, and is disposed on the first disk plate 202 on the opposite side to the piston 12. The second disk plate 206 has essentially the same diameter as that of the first disk plate 202, and is disposed on the constant orifice plate 204 on the opposite side to the first disk plate 202. The third disk plate 208 has essentially the same diameter as that of the second disk plate 206, and is disposed on the second disk plate 206 on the opposite side from the constant orifice plate 204. The fourth disk plate 210 has essentially the same diameter as that of the third disk plate 208, and is disposed on the third disk plate 208 on the opposite side from the second disk plate 206. An annular space 212 is formed between the first and second disk plates 202 and 206 outside the constant orifice plate 204.

Figures 16, 18:
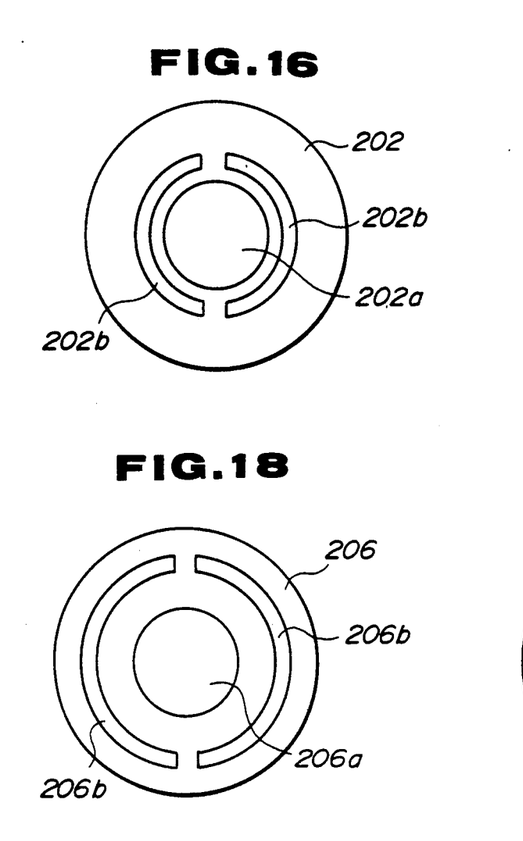
Figs. 16 to 20 are plan views of disk plates of a disk valve assembly used for the shock absorber of FIG. 15.
Figures 17, 19:
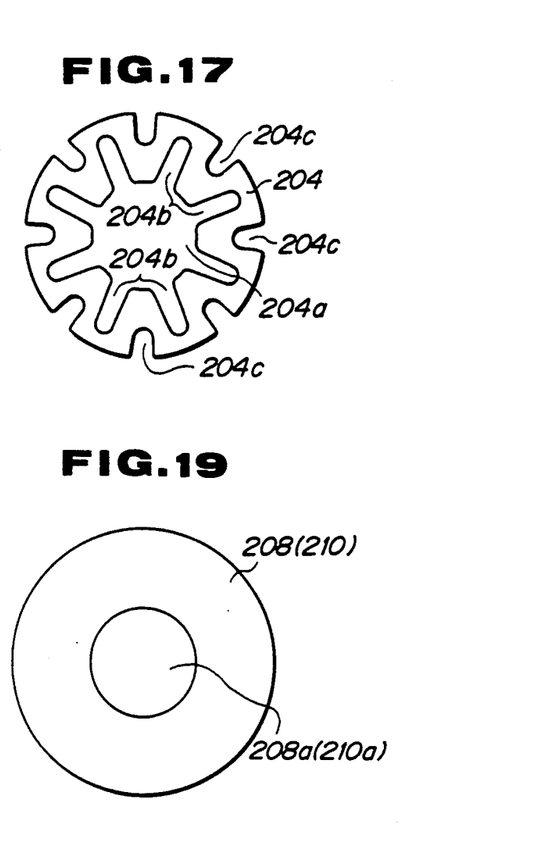
Figure 20:
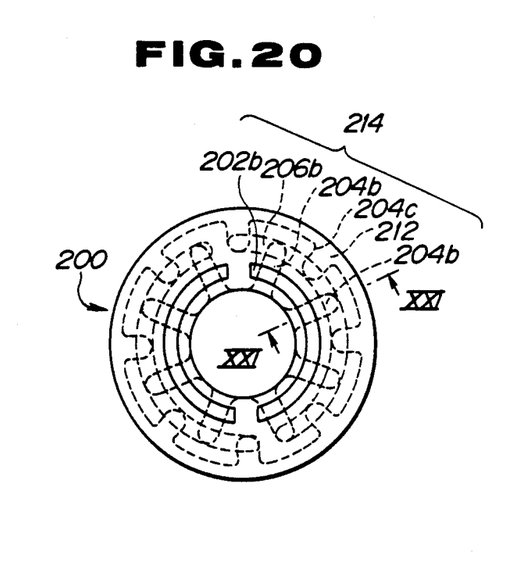

As can be seen clearly from FIGS. 16 to 19, the respective disk plates 202 to 210 have circular through openings 202a, 204a, 206a, 208a and 210a at the center thereof, and these openings have essentially the same diameter. As shown in FIG. 16, the first disk plate 202 has a pair of arc-shaped through openings 202b which are concentrically arranged at locations neighboring the circular through opening 202a so as to surround essentially the entire circumference of the circular through opening 202a. The arc-shaped through openings 202b are designed to be in fluid communication with the fluid passage 20. As shown in FIG. 17, the circular through opening 204a of the constant orifice plate 204 has a plurality of radially extending portions 204b which are arranged at a predetermined interval. The radially extending portions 204b are designed to be in fluid communication with the arc-shaped through openings 202b at locations neighboring the roots thereof. The radially extending portions 204b serve as orifices and thus will be referred to as "first constant orifices". The constant orifice plate 204 also has a plurality of U-shaped cut-outs 204c which are formed at the circumference thereof between the radially extending portions 204b to extend radially. As shown in FIG. 18, the second disk plate 206 has a pair of arc-shaped through openings 206b which are so arranged as to surround essentially the entire circumference of the circular through opening 206a. The radius of curvature of the arc shaped through opening 206b is greater than that of the arc-shaped through opening 202b of the first disk plate 202, so that the first constant orifices 204b of the constant orifice plate 204 are in fluid communication with the arc-shaped through openings 206b at locations neighboring the tips thereof. The cross sectional area of flow passage in the arc-shaped through opening 206b of the second disk plate 206 is designed to be less than that of the first constant orifice 204b of the constant orifice plate 204, and greater than that of flow passage in the U-shaped cut-out 204c of the constant orifice plate 204. Therefore, the arc-shaped through opening 206b and the U-shaped cut-out 204c serve as orifices and thus will be referred to as "second constant orifice" and "third constant orifice", respectively. With these constructions, a bypassing fluid passage 214 comprising the arc-shaped through opening 202b, the first, second and third constant orifice 204a, 206b and 204c, and the annular space 212, is formed in the disk valve assembly 200, and thus the communication between the upper and lower chambers 14 and 16 is established by the bypassing fluid passage 214.

Figure 21:
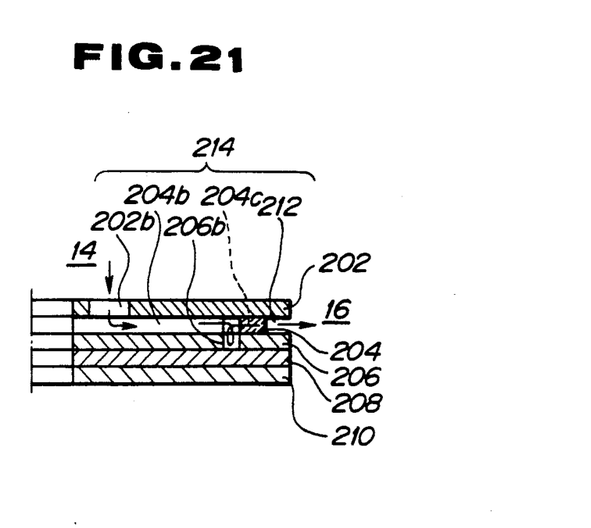
FIG. 21 is a fragmentary sectional view of the disk plates of FIGS. 16 to 20, which illustrates a bypassing fluid passage formed in the disk plates.

With the aforementioned constructions, when the working fluid in the upper chamber 14 is introduced into the lower chamber 16 while the amplitude of the piston 12 is very small, the working fluid passes through the bypassing fluid passage 214. In this case, area of the fluid passage 214 is gradually narrowed at each of the first, second and third constant orifices 204a, 206b and 204c which are arranged in series, i.e. flow resistance is applied to the working fluid at three points in its flow path by means of these orifices. Therefore, compared with the first preferred embodiment of a hydraulic shock absorber of the invention, differences between fluid pressures before and behind each of the orifices, and differences between the flow speed before and behind the latter become smaller. As a result, compared with the first embodiment, the fluid pressure and flow speed of the working fluid is more gradually decreased, so that it is possible to more effectively decrease the production of flow noise of the working fluid.

Figure 22:
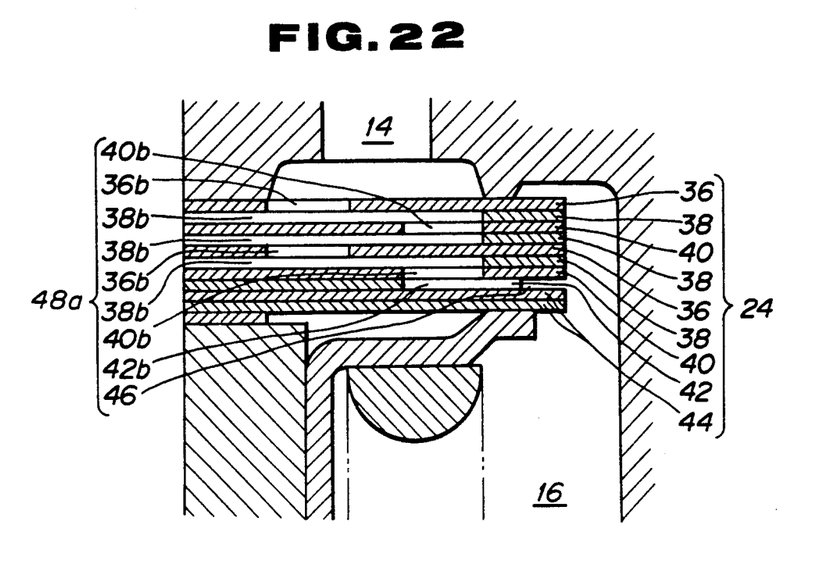
FIGS. 22 to 26 illustrate other modifications of the first to third preferred embodiments of the invention.

FIG. 22 illustrates a modification of the first preferred embodiment. In this case, four orifices are formed by the disk plates 36 to 44, i.e. flow passage is narrowed at four points. In accordance with fluid pressure applied to the disk valve assembly or rigidity of the elastic disk, more orifices can be formed in the disk valve assembly.

Figure 23:
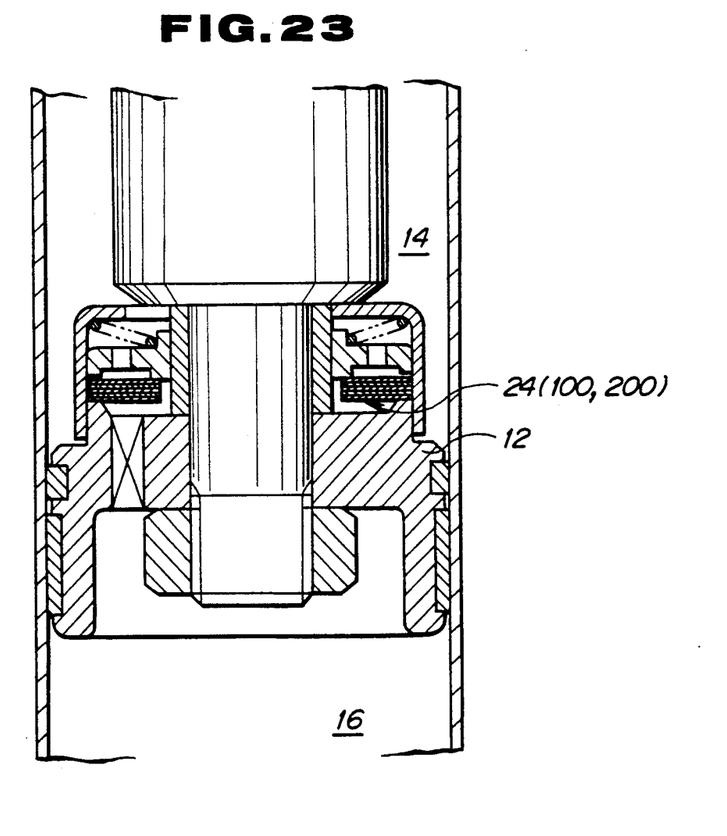
Figure 24:
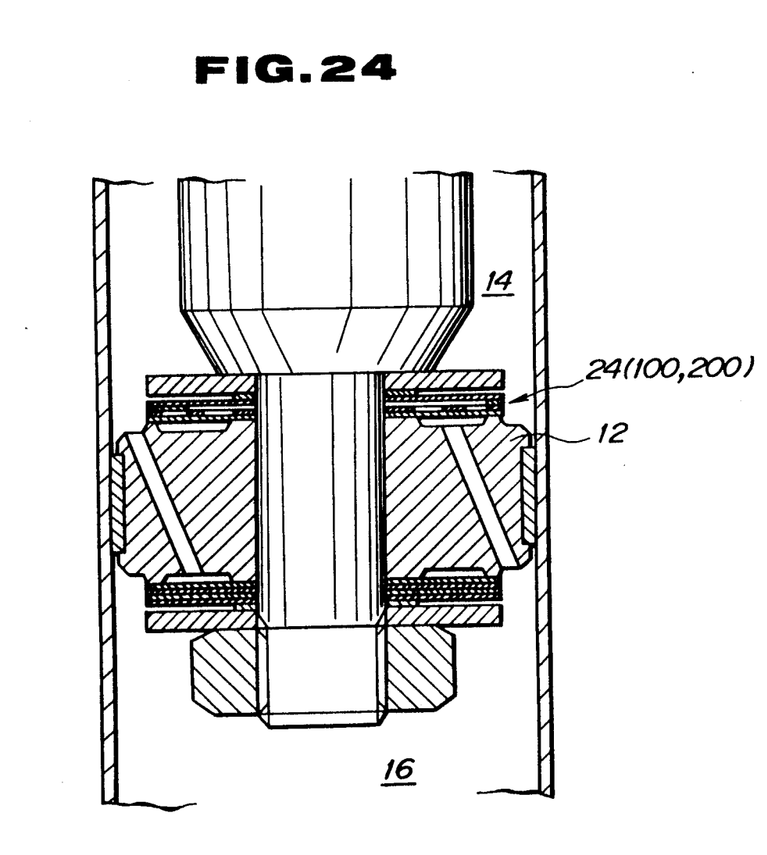
Figure 25:
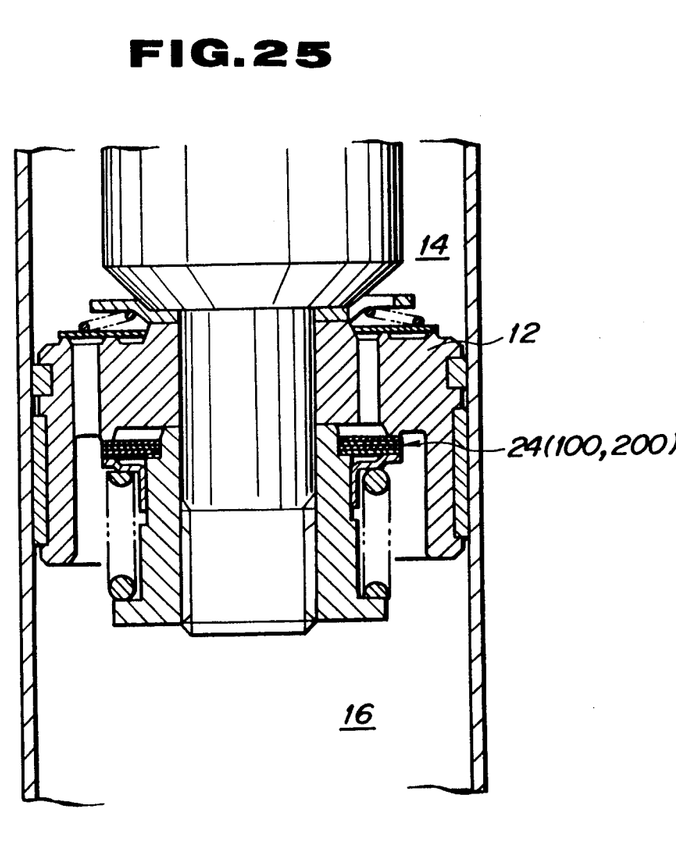
Figure 26:
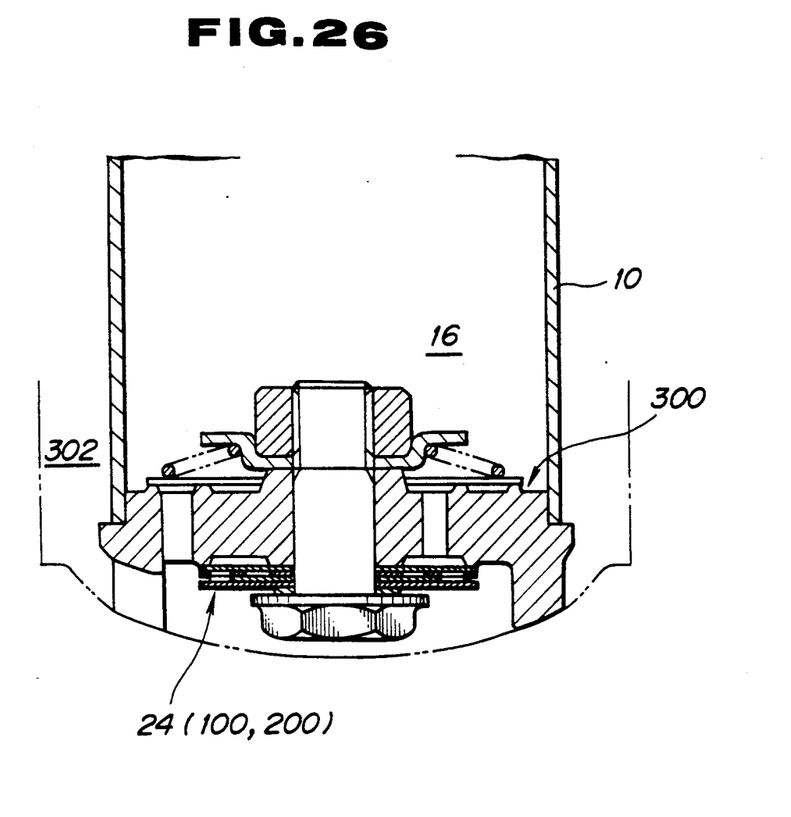

According to the present invention, as shown in FIG. 23, the disk valve assembly 24, 100 or 200 may be provided above the piston 12 in order to produce a damping force in the expansion stroke of the piston. In addition, as shown in FIG. 24, the disk valve assembly 24, 100 or 200 may be substituted for the disk valve assembly 50 in order to produce a damping force in the compression stroke of the piston. The inner portion of the disk valve assembly 24, 100 or 200 may be fixed as shown in FIG. 25. As shown in FIG. 26, the disk valve assembly 24, 100 or 200 may be provided on a base valve 300 which is provided on the bottom of the cylinder 10, so that fluid resistance may be applied to the working fluid introduced from the lower chamber 16 of the cylinder 10 to a reservoir chamber 302.

As mentioned above, according to the present invention, a bypassing fluid passage is formed in a disk valve assembly provided on a piston or base valve, so as to establish fluid communications between the upper and lower chambers of the cylinder, or between the lower chamber and the reservoir chamber. The bypassing fluid passage has a plurality of orifices which are arranged in series, so that flow resistance is applied to the working fluid at a plurality of points. Therefore, differences between pressures before and behind each of the orifices can be decreased, and flow velocity of the working fluid passing through the respective orifices is decreased. As the working fluid is introduced into the downstream chamber, fluid pressure and flow velocity of the working fluid may be gradually decreased. As a result, it is possible to prevent vortex flow and cavitation from occuring and to decrease the production of fluid noise due to vortex flow and cavitation.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modification to the shown embodiments which can be embodied without departing from the principle of the invention set out in the appended claims.

What is claimed is:

1. In a shock absorber:
a hollow cylinder containing a working fluid;
means for defining a fluid chamber within said hollow cylinder;
said fluid chamber defining means including a member formed with a fluid passage, said fluid passage having one end communicating with said fluid chamber and an opposite end;
a disk valve assembly cooperating with said member to cover said opposite end of said fluid passage;
said disk valve assembly having a plurality of disk plates including an orifice disk plate formed with a plurality of radially extending openings, said orifice disk plate being disposed between an adjacent two of said plurality of disk plates and cooperating therewith to form radially extending passages within said plurality of radially extending openings, respectively;
said plurality of disk plates being formed with opening means for establishing fluid communication between said opposite end of said fluid passage of said member and one radial end of each of said plurality of radially extending passages;
one of said plurality of disk plates being formed with a plurality of outlets, each in the form of a cut-out cut inwardly from a periphery thereof;
one of said two disk plates adjacent said orifice plate, but different from said one disk plate formed with said plurality of outlets, being formed with an arc-shaped downstream opening communicating with at least one of said plurality of radially extending passages at an opposite radial end thereof, said arc-shaped downstream opening communicating with at least one of said outlets wherein said opening means includes an arc-shaped upstream opening formed through said one of said two disk plates adjacent said orifice plate formed with said arc-shaped downstream opening, said arc-shaped upstream opening communicating with at least one of said plurality of radially extending openings at said one radial end thereof.

2. A shock absorber as claimed in claim 1, wherein said plurality of disk plates include a second orifice disk plate covering said arc-shaped upstream and downstream openings and preventing fluid communication therebetween, said second orifice disk plate being formed with an orifice fluidly disposed between said opposite end of said fluid passage and said arc-shaped upstream opening to establish fluid communication therebetween, said opening means including said orifice of said second orifice plate.

3. A shock absorber as claimed in claim 2, wherein said one disk plate formed with said plurality of outlets is said first-mentioned orifice disk plate.

4. In a shock absorber:
a hollow cylinder containing a working fluid;
means for defining a fluid chamber within said hollow cylinder;
said fluid chamber defining means including a member formed with a fluid passage, said fluid passage having one end communicating with said fluid chamber and an opposite end;
a disk valve assembly cooperating with said member to cover said opposite end of said fluid passage;
said disk valve assembly having a plurality of disk plates including an orifice disk plate formed with a plurality of radially extending openings, said orifice disk plate being disposed between an adjacent two of said plurality of disk plates and cooperating therewith to form radially extending passages within said plurality of radially extending openings, respectively;
said plurality of disk plates being formed with opening means for establishing fluid communication between said opposite end of said fluid passage of said member and one radial end of each of said plurality of radially extending passages;
one of said plurality of disk plates being formed with a plurality of outlets, each in the form of a cut-out cut inwardly from a periphery thereof;
one of said two disk plates adjacent said orifice plate, but different from said one disk plate formed with said plurality of outlets, being formed with an arc-shaped downstream opening communicating with at least one of said plurality of radially extending passages at an opposite radial end thereof, said arc-shaped downstream opening communicating with at least one of said outlets wherein said one disk plate formed with said plurality of outlets is said first-mentioned orifice disk plate.

5. A shock absorber as claimed in claim 4, wherein said opening means includes an arc-shaped upstream opening formed through the other one of said two disk plates adjacent said orifice plate and communicating with at least one of said plurality of radially extending openings at said one radial end thereof and also with said opposite end of said fluid passage with which said member is formed.

6. A shock absorber as claimed in claim 5, wherein said one disk plate formed with said plurality of outlets is disposed adjacent said disk plate formed with said arc-shaped downstream opening.

* * * * *